Aug. 14, 1951 D. H. HOLDEN 2,564,362
GASEOUS DISCHARGE TUBE FIXTURE
Filed Dec. 23, 1946 5 Sheets-Sheet 1

INVENTOR.
Dean H. Holden
BY
Frank M. Hough
Attorney

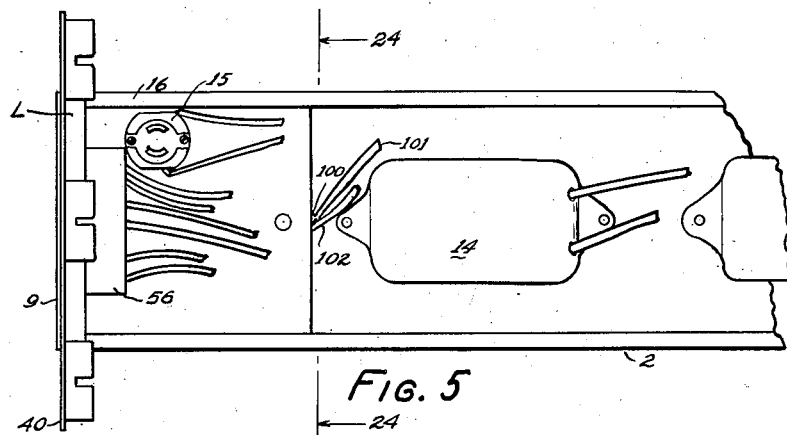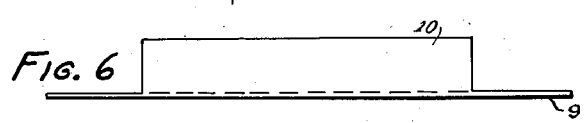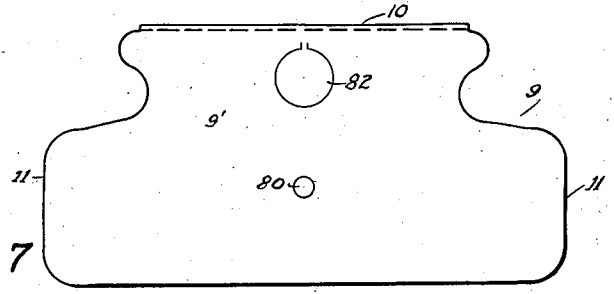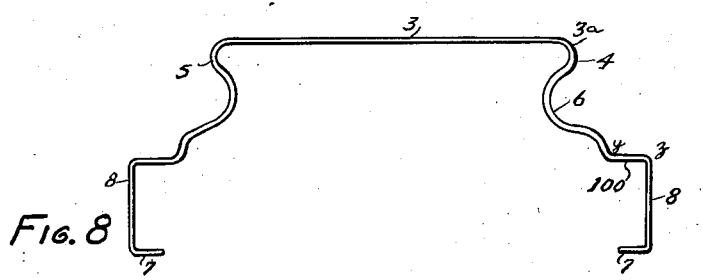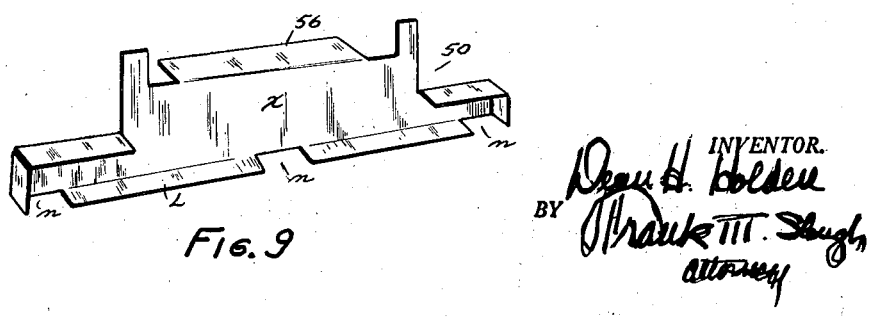

Aug. 14, 1951 D. H. HOLDEN 2,564,362
GASEOUS DISCHARGE TUBE FIXTURE
Filed Dec. 23, 1946 5 Sheets-Sheet 3

INVENTOR.
Dean H. Holden
BY
Attorney

Aug. 14, 1951 D. H. HOLDEN 2,564,362
GASEOUS DISCHARGE TUBE FIXTURE
Filed Dec. 23, 1946 5 Sheets-Sheet 5

Patented Aug. 14, 1951

2,564,362

UNITED STATES PATENT OFFICE 2,564,362

GASEOUS DISCHARGE TUBE FIXTURE

Dean H. Holden, Cleveland, Ohio, assignor to Holdenline Company, Cleveland, Ohio, a corporation of Ohio Application December 23, 1946, Serial No. 718,018

3 Claims. (Cl. 240—51.11)

My invention relates to combined wiring conduits and gaseous discharge tube fixtures, and relates more particularly to structures which may be adapted for use with different lighting units to provide various type lighting where required or various overall lengths.

My present invention also involves the provision of a standard basic unit which may be used either as the basic unit of each of many individual gaseous discharge tube fixtures or as sections of continuous series of such units, these units being placed end to end to achieve the desired length, providing great ease for continuous wiring and an uninterrupted channelway for the electrical connections to pass through.

My invention, comprising such basic unit, also provides a structure with which various type reflectors may be used, louvring may be added or glass or plastic enclosures for concealment of the lamp holders be used.

It further contemplates a basic unit with which various numbers of lamps may be employed and provides various auxiliary means easily added to the unit to achieve the same.

A further object of my invention is to provide a basic unit wherein the lamp holders are protected during shipping and use of such units.

Various other and numerous objects of my invention will become more apparent by reference to the drawings and following description of my invention.

In the drawings:

Fig. 5 is a fragmentary plan view of the bottom of a part of the channel or raceway of a second embodiment of my invention;

Fig. 6 is a top view of the raceway cap adapted to be employed with the various forms of my invention;

Fig. 7 is an end view of the cap of Fig. 6;

Fig. 8 is a profile view of the channel or raceway unit of my invention;

Fig. 9 is a perspective view of a wire cover adapted to be employed with the lamp holder of Fig. 5;

Figure 1:
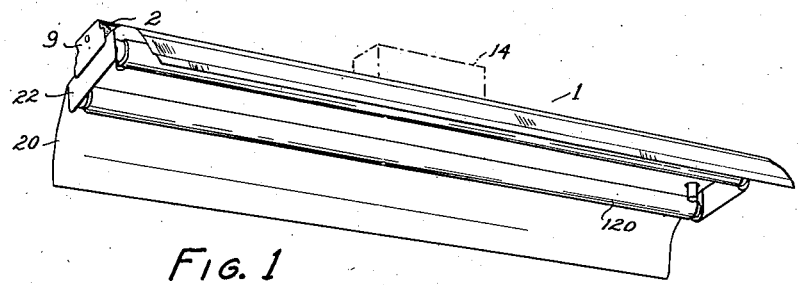
Fig. 1 is a perspective view of the first embodiment of one fluorescent light fixture of my invention.
Figure 4:
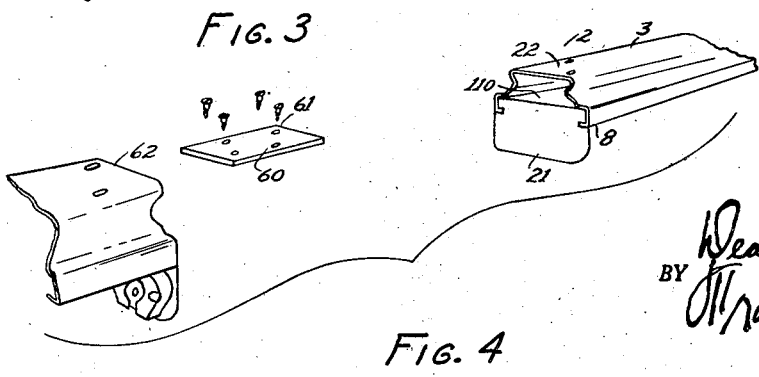
Fig. 4 is an exploded view of the various parts of the end portions of a pair of units similar to that illustrated in Fig. 1 but with the various component parts being shown in spaced relation before end-to-end assembly of the parts.
Figure 10:
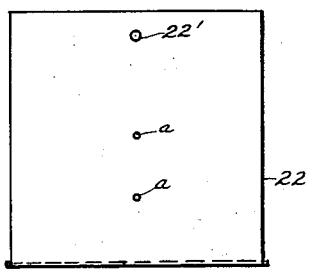
Fig. 10 is a top plan view of the end plate of Fig. 4.
Figure 15:
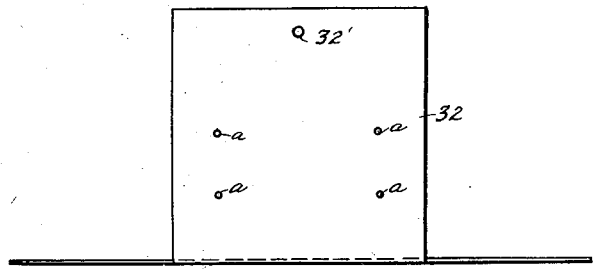
Fig. 15 is a top plan view of a different end plate adapted to be used with the basic unit of my invention and accommodating four lamps.

Referring now to the drawings, in all of which like parts are designated by like reference characters, at 1, Fig. 1, I indicate one fluorescent lighting fixture having the basic unit of my invention embodied therein, said lighting fixture comprising an elongated housing, such as the metal channel element 2 illustrated. Said housing 2 is adapted to be suspended from the ceiling or wall in any well known suitable manner and is adapted to preferably house, or carry on its top, a lamp "ballast" 14 or other control equipment for fluorescent lamps, and is adapted to enclose essential wiring for the circuit, and the lamp starter, and to be simply and easily provided with lamp holders of various types and which afford covers for the wiring. The element 2 is of any preferred length and may be employed singly, as shown in Fig. 1, or in assembled units, integrally united, as indicated in Fig. 4.

Figure 2:
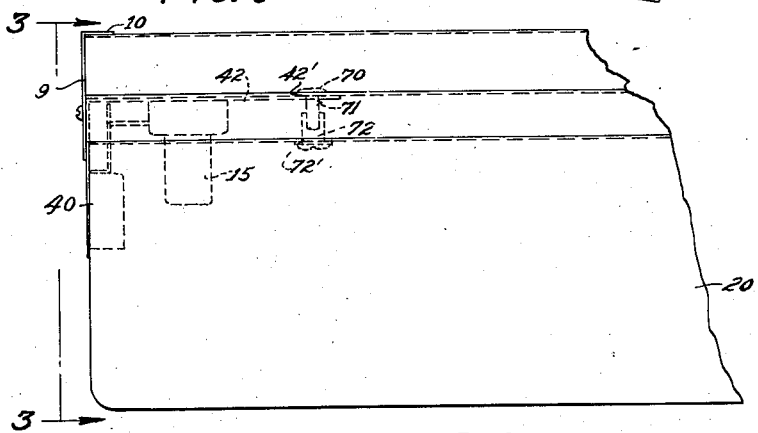
Fig. 2 is a partial side view of an end of the fluorescent light fixture of Fig. 1.
Figure 3:
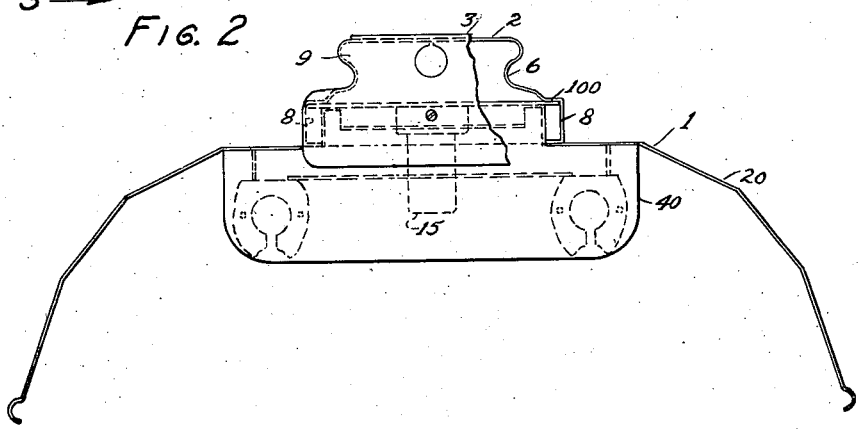
Fig. 3 is an end view taken on the line 3—3 of Fig. 2 with portions broken away and dotted lines showing underlying portions.
Figure 21:
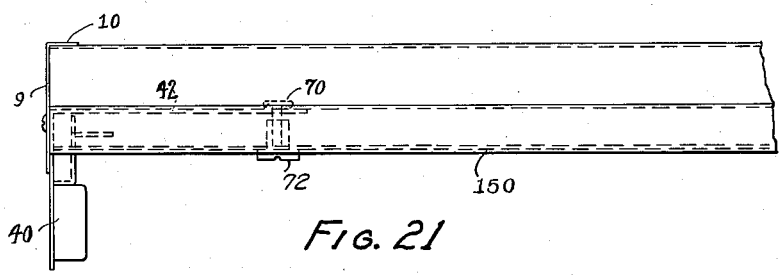
Fig. 21 is a partial side view of another embodiment of my invention.

A reflector 20 of any preferred form, whether trough-shaped or not, may be associated with the channel element 2 and in the form illustrated in Figs. 1 to 3 inclusive, its center portion forms a bottom closure element for said channel and for the wire run thereof, whereby a box-like enclosure element is formed having open ends; alternatively the bottom enclosure may be provided by a bottom pan unit as shown in Fig. 21, or by such other instrumentalities as louvring elements, etc.

The web 3, of the channel 2, is disposed uppermost and the resultantly pendant sides 4 and 5 extend downwardly from the lateral edges of said web to afford first an internal uppermost groove at 3a which is disposed directly above the downwardly adjacent external groove 6, the channel sides 4 and 5 then extending relatively divergingly to support the lowermost opposing channel shaped portions 8, there being an external convex bend between the external groove 6 and the uppermost arm 100 of the channel portions 8 for purposes of stiffening the side walls. The channel portions 8 thus have an intermediate lateral outermost web and the relatively upper and lower sides 100 and 7, each of said channels being rectilinear in form and the corresponding parts of each being disposed relatively parallel, longitudinally of the housing channel 2.

Associated with each open end of the channel 2 is a lamp holder end plate, variously formed, as indicated at 21, 30, 40 or 50, in Figs. 1, 3, 4, 5, 11 and 16, to accommodate various numbers of lamp sockets, according to preference and desired placement of the lamps 120. Each of these end plates 21, 30, 40 and 50 is provided with elongated substantially flat preferably rectangular horizontally disposed flange portions 22, 32, 42, and 52 respectively, of such width as to be supported by suitably formed laterally disposed projections in tight press fit engagement or to be welded or otherwise attached, within the said opposing side channels having the webs 8, against the inner downwardly facing surfaces of the channel arms 100, the inner surfaces of the channel sides 100 and/or in engagement with the said webs 8 of each said opposing channel, as best shown in Fig. 3. Each of said flange portions 22, 32, 42 and 52 are provided with an aperture 22', 32', 42' or 52' respectively similarly disposed adjacent the inner ends and preferably centrally thereof, through which a reflector securing bolt 70 is adapted to project, the heads of each said bolt being preferably welded to said uppermost horizontal flange or the bolts are in any other manner secured to and supported by the portions 22, 32, 42 and 52.

Figure 22:
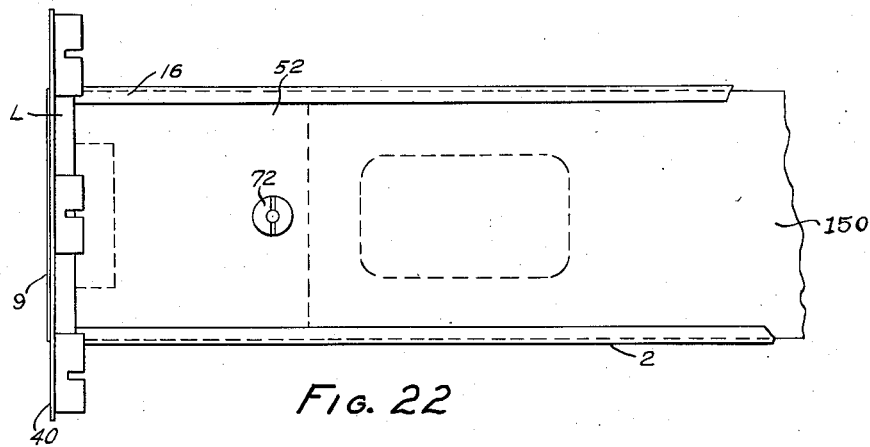
Fig. 22 is a bottom plan view of the embodiment of Fig. 21.
Figure 23:
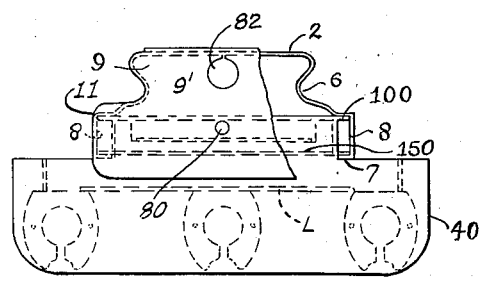
Fig. 23 is an end view of the said embodiment, a portion being broken away for greater clarity.
Figure 24:
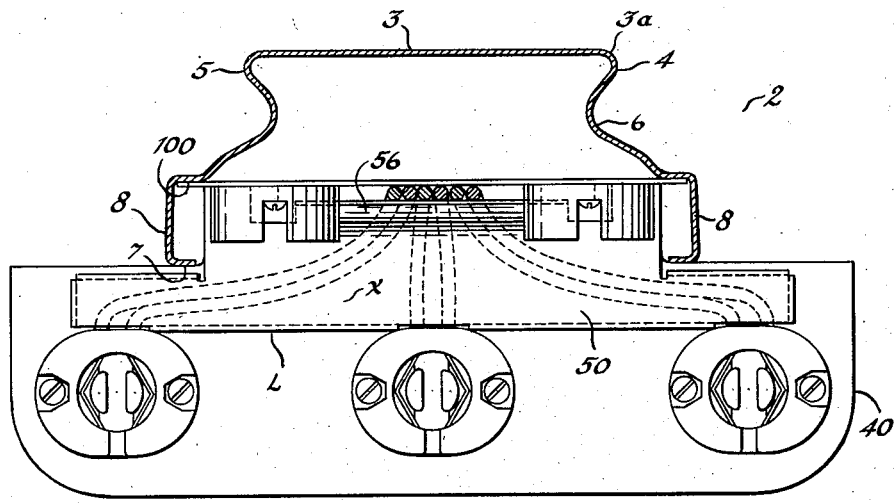
Fig. 24 is a view taken on the line 24—24 of Fig. 5.

The intermediate portion of the reflector 20 is adapted to be bolted by a longitudinally interspaced series of bolts such as those shown at 70 to the web of the channel 2, by means of an associated threaded self-locating, knurled nut 72 projected upwardly through apertures 72' of the medial longitudinally extending portion of the reflector 20, the threaded ends 71 of each said bolt 70 being interthreaded with the internal threads of each said nut 72 as best shown in Figs. 2, 21 and 22.

It will be understood, of course, that where a pan cover element such as shown at 150 is employed to close the channel housing 2, instead of a reflector, that such pan covers are secured in place in the same manner as above described for the longitudinally extending transversely medial portion of the reflector.

The said spacer plate portions are also preferably provided with a pair of pairs of aligned apertures a—a, within which screw members s—s may be disposed to secure a starter block 15 or starter blocks, as the case may be, to the said plate.

Each of the lamp holder end plates are, as best shown in Figs. 1, 3, 4, 5, 11 and 16, formed with a horizontal and a depending flange, each flange of every pair being disposed at right angles to the other, the pendant flange as at 21, Fig. 4 being adapted to be fitted over the associated open end of the channel unit 2, and forms a partial closure element therefor, and as shown, an upper portion thereof is of such width and length as to be disposed between the opposite parallel webs 8—8 of the inwardly facing channels, there being a pendant apron portion for each said pendant flange which is of increased width and depth.

Figure 11:
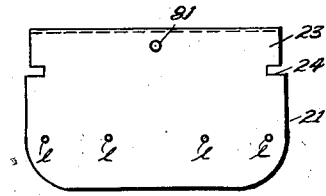
Fig. 11 is an end view of the end plate of Figs. 4 and 10.
Figure 16:
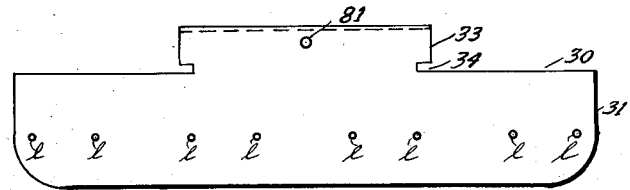
Fig. 16 is an end view of the end plate of Fig. 15.
Figure 12:
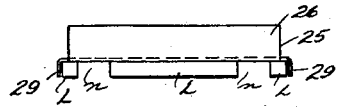
Fig. 12 is a top plan view of a wiring cover adapted to be associated in use with the lamp holder of Figs. 4, 10 and 11.
Figure 17:
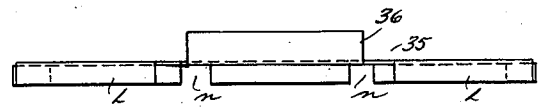
Fig. 17 is a top view of a wiring cover adapted to be operatively associated with the lamp holder of Figs. 15 and 16.
Figure 13:
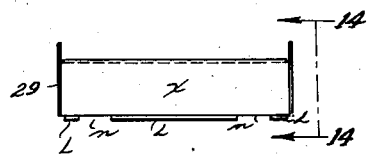
Fig. 13 is a bottom plan view of the wiring cover of Fig. 12.
Figure 18:
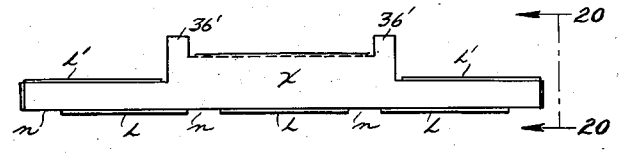
Fig. 18 is a bottom plan view of the wiring cover of Fig. 17.
Figure 19:
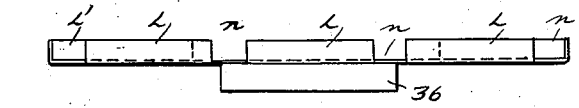
Fig. 19 is a bottom view of the cover of Figs. 17 and 18.
Figure 14:
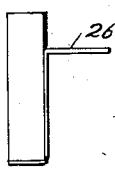
Fig. 14 is an enlarged view taken on the line 14—14 of Fig. 13.
Figure 20:
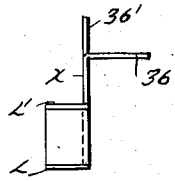
Fig. 20 is an end view enlarged and taken on the line 20—20 of Fig. 18.

In the forms of my invention shown in Figs. 4, 11 and 16, a pair of oppositely disposed notches 24 or 34 in the sides of said end plates are provided within which the ends of the lowermost inwardly directed flanges, or sides, 7—7 of the channel are projected. In the form of my invention which is illustrated in Fig. 3, the upper portion of the end plate is provided with a laterally projecting shoulder, which engages and is preferably welded to the downwardly facing surface of the channel wall portions or shoulder 100, on either side of the channel unit 2 in lieu of the use of notches 24 and 34, and the said remaining portion of the upper portion of said end plates is of lesser width than that space disposed between the opposite parallel sides 8—8 of the channel unit, or relatively so.

The width and length of the depending apron, in the variant forms of my invention, is preferably formed in accordance with the number of lamp sockets to be carried thereby and their preferred placement, as indicated at 1—1. The form of Figs. 1 to 3 inclusive and Fig. 11 carries two spaced lamp sockets, that of Fig. 5 three lamp sockets and Fig. 16, four lamp sockets.

The lamp holder end plates, which preferably may be designated as socket supporting plates, are especially designed to permit the use of the well-known butt-on type of lamp sockets, which are secured onto the inner surfaces of the plates, the plates being rigidly secured as by welding the lateral border portions of their horizontal flanges to the downwardly facing surfaces 100 of the channel member 2. Each plate protects the lamp sockets which are carried on the inner face of its pendant flange.

The starter socket such as that shown at 15, Fig. 5, is preferably secured to the underside of the horizontal flange such as 52 of each support, and also is protected by the pendant vertical flange of the end plate such as 50 of the support. A box-like wire cover of that particular configuration which is determined by the number of lamp sockets which are carried by the socket supporting plate, and therefore, may be any of the forms illustrated in Figs. 2, 9, 12 to 14, inclusive, and 17 to 20, inclusive, and all of which are provided with a horizontal flange L in lateral abutting engagement with any such starter socket.

The wiring leading to the lamp sockets is passed between any such horizontal flange L and the under surface of the horizontal flange such as 52, Fig. 5, of the lamp socket supporting plate such as 50. Other wiring leading from one section of the lamp to a longitudinally aligned relatively rigidly affixed second fixture section may be passed between the upper surface of the horizontal flange of the lamp socket support and the underside of the web of the channel plate.

The lamp holder sockets, as will be understood by those skilled in the art to which my invention appertains, will be connected by lead wires to the ballast starter block, if used, and auxiliaries thereto, and to lead wires connected to the power service lines, and therefore the channel raceway must accommodate the various wires connected to said lamp holder sockets. To cover said wires at a point adjacent their socket connections so that the same may be protected in service and shipment, etc., various wire covers 25—35 are preferably provided and such improved wire covers are so shaped as to correspond to the lamp holder and plate with which they are associated in order that the lead wires from each lamp holder socket are covered and directed through a central guide element over the spacer plate portions of the preferred end plates to the raceway as best shown in Fig. 5.

These wire covers, as shown in Figs. 2, 9, 12, 13, 14, 17, 18, 19 and 20, are provided with a generally L-shaped box-like portion, an upper ledge L of said portion adapted to be maintained in close relation to the said sockets, a plurality of notches $n$ being provided in said ledge through which the pairs of wires connected to each socket may pass to the wire cover, said notches being of substantially the same or less width as the preferably flat butting surface of each said socket.

The number of notches $n$ provided in the wire cover obviously corresponds to the number of sockets provided on the lamp holder end plate with which the wire cover is associated. The wire covers are further each provided with face portions X having a substantial portion thereof disposed substantially parallel to and in spaced relation from said end plate, being spaced therefrom by means of the said ledge portions L being disposed at substantially right angles thereto and by shelf portions L' disposed in parallel relation to said ledge portions. Opposite ends of the said face portion X are preferably bent rearwardly and at right angles to the remainder of the face portion which is provided with downwardly extending legs 36' preferably seated upon the rectangularly formed spaced plate portions $c$ of the socket holders, and an inwardly directed center portion which is disposed over the wire connections leading from the sockets to their raceway connections.

The channel raceway, as best illustrated in Fig. 4 is provided with an open passageway, disposed below the web 3 of the channel 2, and through which the leads 101—102 from the fixture pass in order that they may be connected to the service lines which preferably either pass through an opening 82, Fig. 7, in the end cap or other preferred opening, provided by knockouts in the upper portion of the housing channel. Thus in using a pair or more of such housing units, the leads may pass directly from one such unit to the next through the adjacent aligned open passageways of each and in such cases separate service lines will not be required to be associated with each unit.

A pair of end caps 9, of a profile similar to that of the channel wireway 2, as best shown in Fig. 8, or of an ornamental design as may be desired, are preferably secured at either end of the open housing 2, an inturned upper portion 10 of which in the form shown is adapted to overlap the ends of the web 3 of the channel. Such end caps are not employed at the interconnected ends of pairs of housing units which are secured together in end to end relationship.

The depth of the apron portion 8' of the end caps, when used, is preferably of greater depth than the length of the parallel sides 8 of the channel and depends therefrom overlapping the lamp holder and plates disposed on the same end of the channel; and a perforation 80, disposed medially of the apron 9' of the end cap, is aligned with a similarly disposed aperture 81, disposed medially of that portion of the lamp holder end plate which is disposed between the side wall 8—8 of the channel.

A knockout plug 82 may further be provided in each of the end caps 90 through which wires from other similarly formed lighting fixtures 62 may pass. Or, in lieu thereof, a rectangular plate 60, having apertures 61 disposed therethrough, may be used to connect a lighting fixture, such as 22, to a lighting fixture, such as 62, and an unhampered continuous passage 110 is thus provided through which wires from the various fixtures are connected.

Preferably, this is achieved, by removing the end plates such as shown at 9, Fig. 4, from the end openings of each abutted channel 2, and by substituting plates such as shown at 21 therefore, the bridging connector strap plate 60 being then placed under the webs 3 of the end portions of the abutted sections of the channel 2; then bolts are passed through the apertures 61 of the plate 60, and through relatively aligned apertures of the said channel webs which are shown as disposed near the abutted channel section ends. Said bolts or securing screws are indicated in the second showing of Fig. 4, in proximity to the plate apertures 61.

Thus, it will be seen that the lamp holder plates serve, not only as holders for the sockets for the fluorescent lights 120, but also serve as partial closure members for the channel and as spacing members disposed parallel to the web 3 of the channel and are adapted to carry starter blocks, such as that illustrated at 20, said combined lamp holder and spacer means being adapted to be permanently secured as a part of the channel member and wire covers of variant form adapted to be associated therewith to act as guides and covers for wires.

Although, I have described my invention in connection with certain preferred embodiments thereof, I am aware that numerous and extensive departures may be made therefrom without however, departing from the spirit of my invention and the scope of the appended claims.

I claim:

1. A gaseous discharge lamp holding fixture unit comprising an elongated inverted channel shaped housing, a pair of end plates for each housing end, said plates being each of angular formation having a vertical flange and an upwardly disposed horizontally extending flange, said housing channel comprising an uppermost web and pendant sides, each said side comprising a longitudinally extending inner surface disposed substantially below the web, each horizontally extending flange of each end plate being rigidly secured in abutting relation to a relatively different one of said channel side surfaces, at least one lamp socket of the butt-on type being secured to the vertically extending flange of each said end plate, said channel web and the horizontally extending flange of said plate being disposed parallel to and in substantially interspaced relation to each other.

2. The fixture unit substantially as set forth in claim 1, characterized by the provision of a gaseous lamp starter socket secured in inverted position to the horizontal flange of each end plate, and by a cover plate for wiring secured to the said end plate, said cover plate having a vertical portion in interspaced parallel relation to the vertical flange of said end plate.

3. The fixture unit substantially as set forth in claim 1, characterized by the provision of a gaseous lamp starter socket secured in inverted position to the horizontally extending flange of each end plate, and by a cover plate for wiring secured to the said end plate, said cover plate having a vertical portion in interspaced parallel relation to the vertical flange of said end plate and having a horizontal portion which laterally abuts against said starter socket, said vertical portion of said cover plate being provided with spacing extensions engageable with the vertical flange of said end plate to permit wiring conductors to be interposed between the vertical portion of said cover plate and the vertical flange of said end plate.

DEAN H. HOLDEN.

REFERENCES CITED

The following references are of record in the file of this patent:

UNITED STATES PATENTS

| Number | Name | Date |
| --- | --- | --- |
| 2,291,490 | Naysmith | July 28, 1942 |
| 2,291,491 | Naysmith | July 28, 1942 |
| 2,316,404 | Carter | Apr. 13, 1943 |
| 2,321,099 | Naysmith | June 8, 1943 |
| 2,376,363 | Kloner | May 22, 1945 |
| 2,399,501 | Mueller et al. | Apr. 30, 1946 |
| 2,408,783 | Kloner | Oct. 8, 1946 |